United States Patent
Gao et al.

(10) Patent No.: US 10,534,539 B1
(45) Date of Patent: Jan. 14, 2020

(54) DYNAMIC PROGRAMMING BASED EXTENT SELECTION FOR HYBRID CAPACITY EXTENT POOL SYSTEM AND METHOD

(71) Applicant: EMC IP Holding Company, LLC, Hopkinton, MA (US)

(72) Inventors: Jian Gao, Beijing (CN); Ilya Usvyatsky, Northborough, MA (US); Shaoqin Gong, Beijing (CN); Jamin Kang, Beijing (CN); Hongpo Gao, Beijing (CN); Jibing Dong, Beijing (CN); Ree Sun, Beijing (CN)

(73) Assignee: EMC IP Holding Company, LLC, Hopkington, MA (US)

( * ) Notice: Subject to any disclaimer, the term of this patent is extended or adjusted under 35 U.S.C. 154(b) by 138 days.

(21) Appl. No.: 15/664,685

(22) Filed: Jul. 31, 2017

(51) Int. Cl.
*G06F 3/06* (2006.01)

(52) U.S. Cl.
CPC .......... *G06F 3/0604* (2013.01); *G06F 3/0644* (2013.01); *G06F 3/0689* (2013.01)

(58) Field of Classification Search
CPC ..... G06F 3/0604; G06F 3/0632; G06F 3/0689
See application file for complete search history.

(56) References Cited

U.S. PATENT DOCUMENTS

2017/0212705 A1* 7/2017 Kidney ................ G06F 3/0631

* cited by examiner

*Primary Examiner* — Prasith Thammavong
*Assistant Examiner* — Edmund H Kwong
(74) *Attorney, Agent, or Firm* — Brian J. Colandreo; Mark H. Whittenberger; Holland & Knight LLP

(57) ABSTRACT

A method, computer program product, and computer system for selecting, by a computing device, a first disk extent for each RAID extent in an extent pool. Remaining disk extents for each RAID extent in the extent pool may be selected.

17 Claims, 10 Drawing Sheets

DYNAMIC PROGRAMMING BASED EXTENT SELECTION FOR HYBRID CAPACITY EXTENT POOL SYSTEM AND METHOD

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to selecting, by a computing device, a first disk extent for each RAID extent in an extent pool. Remaining disk extents for each RAID extent in the extent pool may be selected.

One or more of the following example features may be included. Selecting the first disk extent may include initializing an N*N Weighted Neighborhood Matrix to zero. Selecting the first disk extent may further include initializing a normalized disk extent consumed ratio to zero. Selecting the first disk extent may further include determining which disk in the extent pool has a least normalized consumed disk extent count. Selecting the first disk extent may further include allocating a disk extent from the least normalized consumed disk extent count. Selecting the remaining disk extents for each RAID extent in the extent pool may include locating a valid and optimal disk extent in the extent pool that results in a lowest variance of Weighted Neighborhood Matrix values. The normalized disk extent consumed ratio and the Weighted Neighborhood Matrix may be updated based upon, at least in part, the located valid and optimal disk extent.

In another example implementation, a computing system may include one or more processors and one or more memories configured to perform operations that may include but are not limited to selecting a first disk extent for each RAID extent in an extent pool. Remaining disk extents for each RAID extent in the extent pool may be selected.

One or more of the following example features may be included. Selecting the first disk extent may include initializing an N*N Weighted Neighborhood Matrix to zero. Selecting the first disk extent may further include initializing a normalized disk extent consumed ratio to zero. Selecting the first disk extent may further include determining which disk in the extent pool has a least normalized consumed disk extent count. Selecting the first disk extent may further include allocating a disk extent from the least normalized consumed disk extent count. Selecting the remaining disk extents for each RAID extent in the extent pool may include locating a valid and optimal disk extent in the extent pool that results in a lowest variance of Weighted Neighborhood Matrix values. The normalized disk extent consumed ratio and the Weighted Neighborhood Matrix may be updated based upon, at least in part, the located valid and optimal disk extent.

In another example implementation, a computer program product may reside on a computer readable storage medium having a plurality of instructions stored thereon which, when executed across one or more processors, may cause at least a portion of the one or more processors to perform operations that may include but are not limited to selecting a first disk extent for each RAID extent in an extent pool. Remaining disk extents for each RAID extent in the extent pool may be selected.

One or more of the following example features may be included. Selecting the first disk extent may include initializing an N*N Weighted Neighborhood Matrix to zero. Selecting the first disk extent may further include initializing a normalized disk extent consumed ratio to zero. Selecting the first disk extent may further include determining which disk in the extent pool has a least normalized consumed disk extent count. Selecting the first disk extent may further include allocating a disk extent from the least normalized consumed disk extent count. Selecting the remaining disk extents for each RAID extent in the extent pool may include locating a valid and optimal disk extent in the extent pool that results in a lowest variance of Weighted Neighborhood Matrix values. The normalized disk extent consumed ratio and the Weighted Neighborhood Matrix may be updated based upon, at least in part, the located valid and optimal disk extent.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

DETAILED DESCRIPTION

Figure 1:
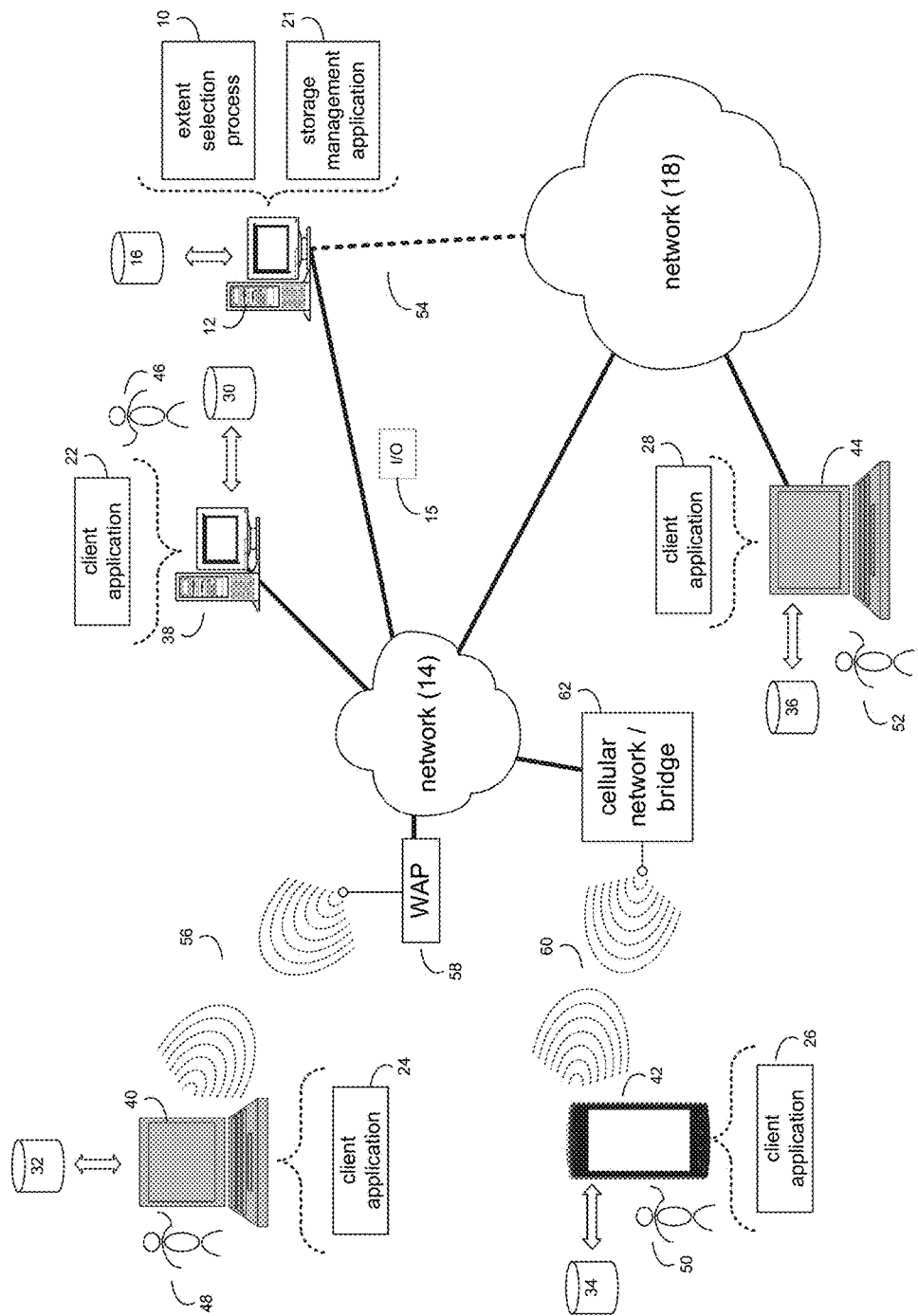
FIG. 1 is an example diagrammatic view of an extent selection process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electromagnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown extent selection process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, an extent selection process, such as extent selection process 10 of FIG. 1, may select, by a computing device, a first disk extent for each RAID extent in an extent pool. Remaining disk extents for each RAID extent in the extent pool may be selected.

In some implementations, the instruction sets and subroutines of extent selection process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, extent selection process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage (ECS™) from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, extent selection process 10 and/or storage management application 21 may be accessed via one or more of client applications 22, 24, 26, 28. In some implementations, extent selection process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within extent selection process 10, a component of extent selection process 10, and/or one or more of client applications 22, 24, 26, 28. In some implementations, one or more of client applications 22, 24, 26, 28 may be a stand-alone application, or may be an applet/application/script/extension that may interact with and/or be executed within and/or be a component of extent selection process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of extent selection process 10 (and vice versa). Accordingly, in some implementations, extent selection process 10 may be a purely server-side application, a purely client-side application, or a hybrid server-side/client-side application that is cooperatively executed by one or more of client applications 22, 24, 26, 28 and/or extent selection process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, extent selection process 10, and storage management application 21, taken singly or in any combination, may effectuate some or all of the same functionality, any description of effectuating such functionality via one or more of client applications 22, 24, 26, 28, extent selection process 10, storage management application 21, or combination thereof, and any described interaction(s) between one or more of client applications 22, 24, 26, 28, extent selection process 10, storage management application 21, or combination thereof to effectuate such functionality, should be taken as an example only and not to limit the scope of the disclosure.

In some implementations, one or more of users 46, 48, 50, 52 may access computer 12 and extent selection process 10 (e.g., using one or more of client electronic devices 38, 40, 42, 44) directly through network 14 or through secondary network 18. Further, computer 12 may be connected to network 14 through secondary network 18, as illustrated with phantom link line 54. Extent selection process 10 may include one or more user interfaces, such as browsers and textual or graphical user interfaces, through which users 46, 48, 50, 52 may access extent selection process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
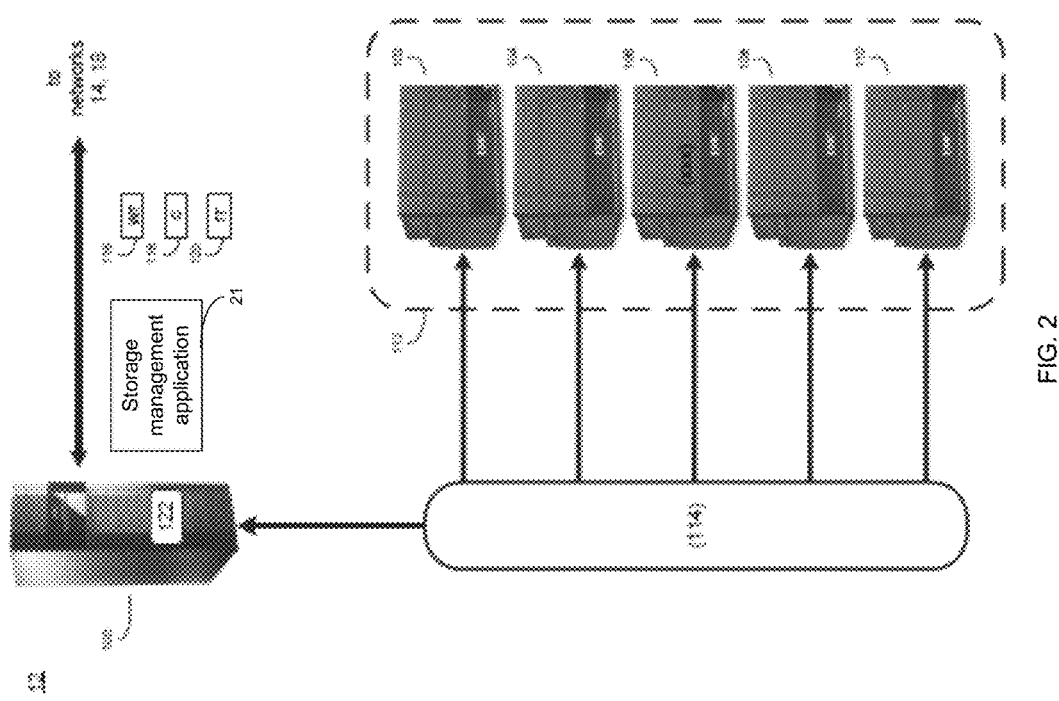
FIG. 2 is an example diagrammatic view of a computer of FIG. 1 according to one or more example implementations of the disclosure.
Figure 3:
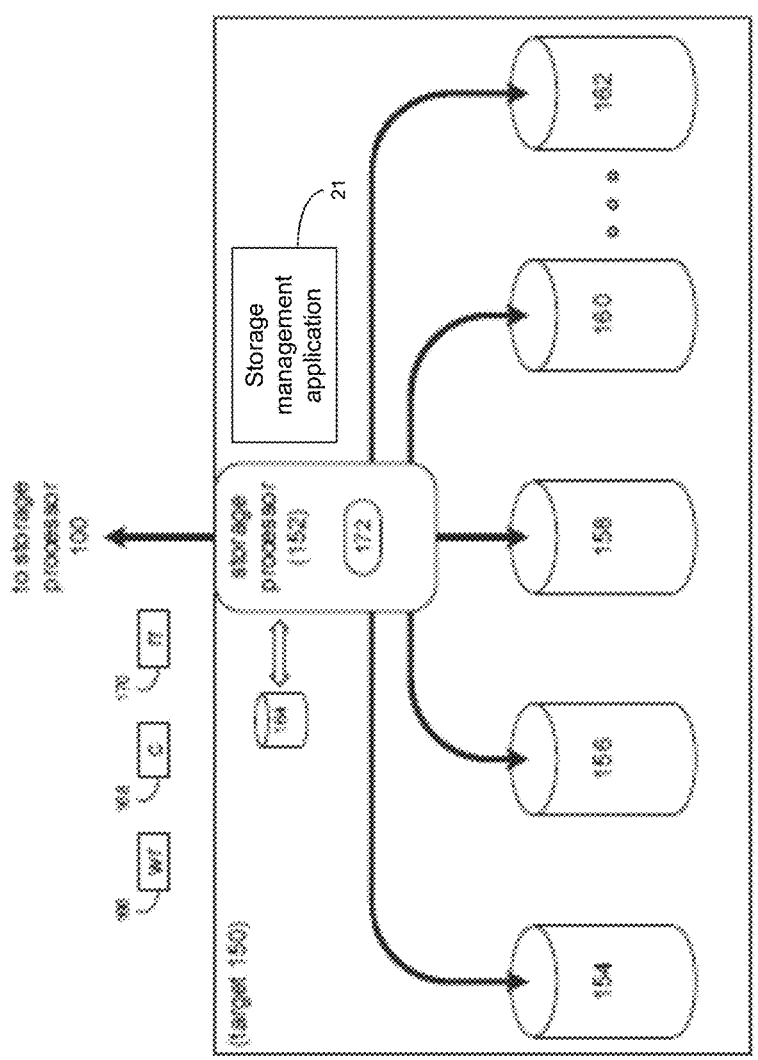
FIG. 3 is an example diagrammatic view of a storage target of FIG. 1 according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or extent selection process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

Figure 4:
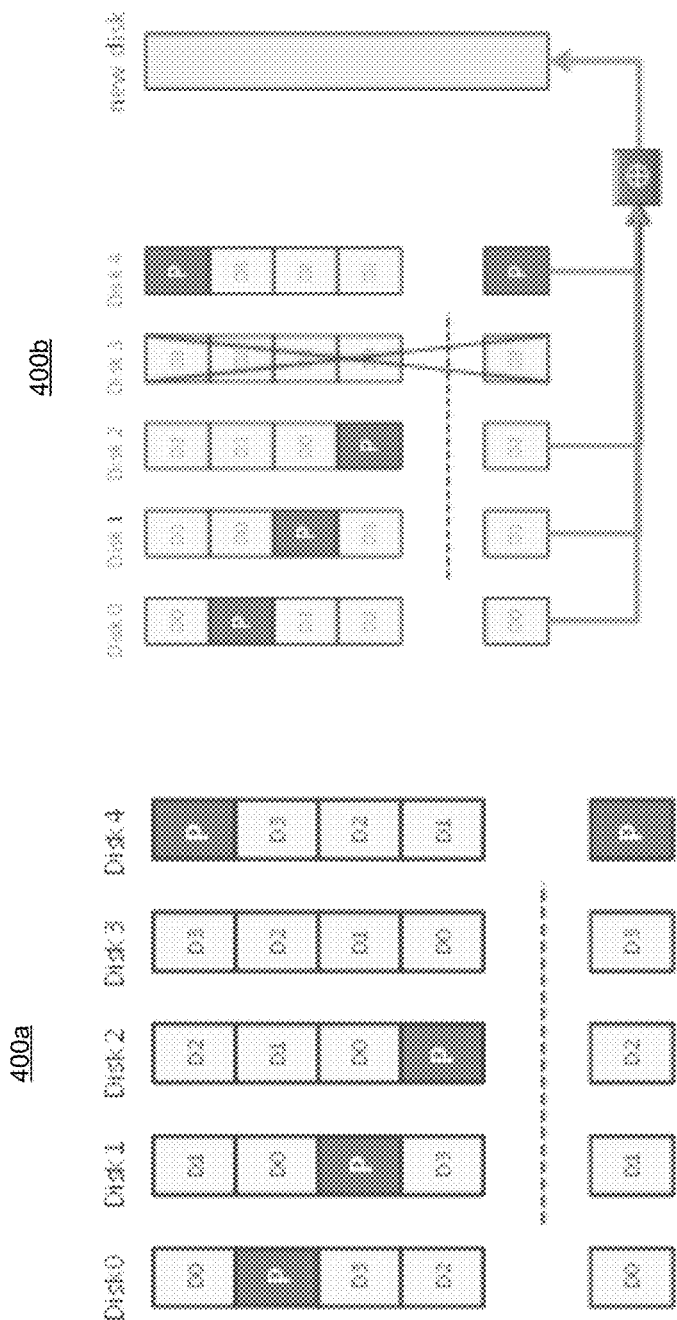
FIG. 4 is an example diagrammatic view of a RAID layout of FIG. 1 according to one or more example implementations of the disclosure.

Example RAID Group:

As discussed above, and referring at least to the example implementation of FIG. 4, an example 4D+1P RAID 5 layout 400*a* that may be managed (e.g., via storage management application 21) is shown. In the example, data may be distributed across the storage devices (e.g., drives) in one of several ways, referred to as RAID levels, depending on the required level of redundancy and performance. As noted above, while one or more of the figures may shows disks as the storage device, it will be appreciated that any of the storage devices discussed throughout may be used.

Shown for example purposes only, RAID 5 may consist of block level striping with distributed parity. Parity information may be distributed among the drives. In the above example, each stripe may consist of five blocks, which may include four data blocks (e.g., D0, D1, D2, D3) and one parity block (e.g., P). Upon failure of a single drive, subsequent reads may be calculated from the distributed parity such that no data is lost. At the same time, a "hot spare" storage device may be selected to replace the dead storage device, and all the data on the failed drive may be rebuilt and written to the new drive. For instance, and referring at least to the example implementation of FIG. 4, an example RAID 5 rebuild 400*b* of the example 4D+1P RAID 5 layout of 400*a* is shown.

As storage device capacity increases, the rebuild time may also increase. As a result, there may be an increased risk of a double storage device failure, which may lead to data loss. It will be appreciated that the rebuild time may be subject to the write bandwidth of the hot spare storage device, which may become a bottleneck. In some situations, it may be difficult to reduce the rebuild time for RAID. In some implementations, Mapped RAID technology have help resolve this issue.

Figure 5:
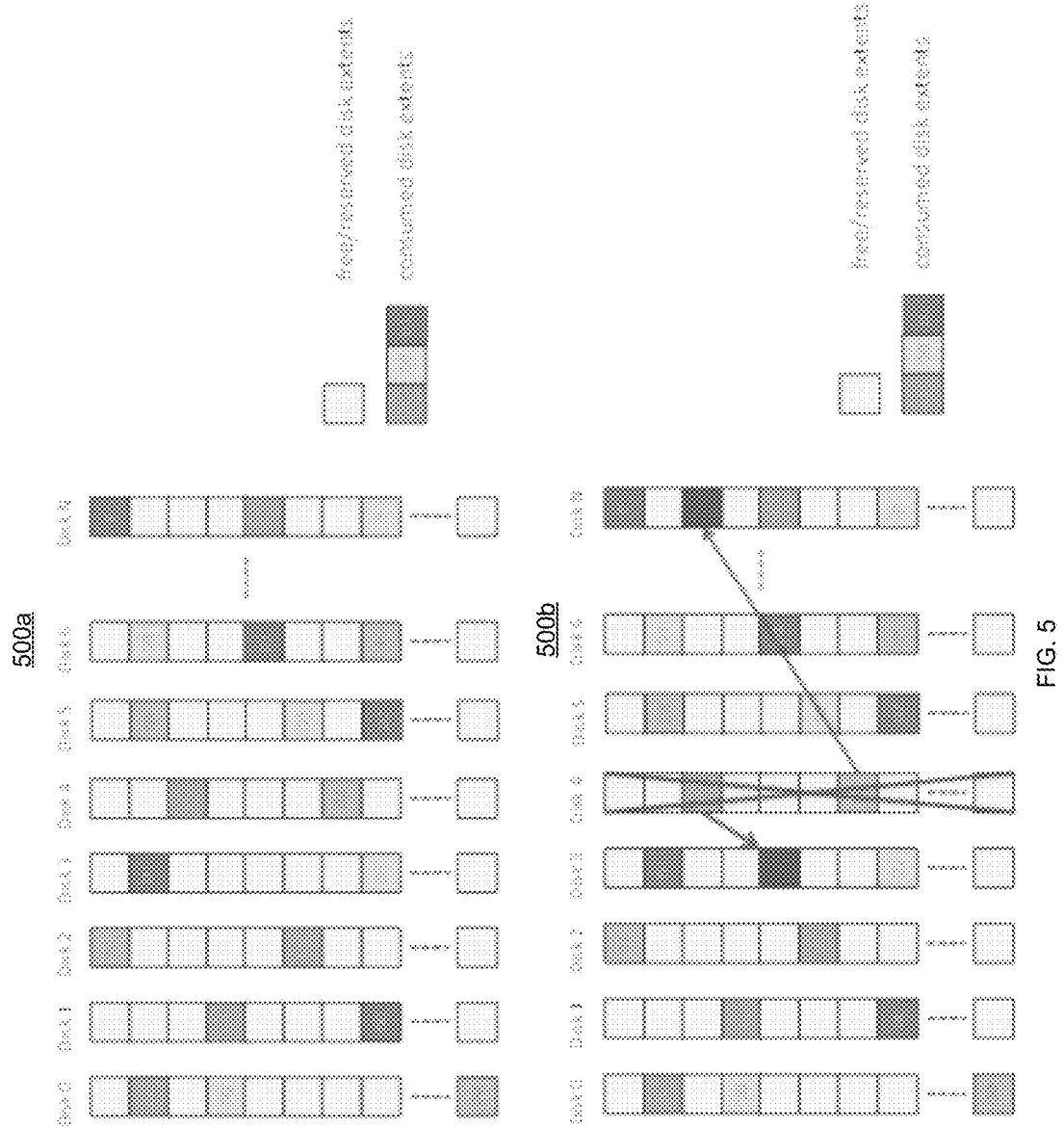
FIG. 5 is an example diagrammatic view of a Mapped RAID extent layout of FIG. 1 according to one or more example implementations of the disclosure.

Example Mapped RAID Group:

In some implementations, and referring at least to the example implementation of FIG. 5, an example Mapped RAID extent layout 500*a* managed (e.g., via storage management application 21) is shown (e.g., a 4D+1P RAID 5 over N disks, where N is greater than 5). Generally, Mapped RAID may be created on top of a disk (or other storage device) pool, which may include N disks (or other storage devices). Broadly speaking, each disk may be viewed as a set of continuous, non-overlapping, fixed sized disk extents. In the example of FIG. 5, while creating a RAID extent, 5 disk extents may be selected from 5 different disks. Some disk extents on each disk may be reserved as hot spare disk extents (e.g., instead of reserving the whole disk as a hot spare disk, which may be typical with a traditional RAID group).

Generally, it may be expected that storage management application 21 may evenly distribute the RAID extents to all disks in the pool, and further expected that all disk space is consumed no matter whether their capacity is the same or not. Typically, when one disk fails, the replacement may be found from other live disks for each disk extent on the dead drive. For instance, and referring at least to the example implementation of FIG. 5, an example disk extent replacement during disk fail in Mapped RAID layout 500*b* of the example Mapped RAID extent layout 500*a* is shown. Generally, an example limitation for the disk extents selection may be that there should be a guarantee that each RAID extent straddles 5 different disks (e.g., assuming the layout in FIG. 5). Moreover, storage management application 21 may be expected to distribute the dead disk extent replacements evenly to live disks.

Example Mapped RAID Rebuild Performance Consideration

As shown in FIG. 5, with Mapped RAID, the example limitation of having the single spare disk write bandwidth may be resolved, since storage management application 21 may replace dead disk extents with extents on different disks. Generally, if better rebuild performance is desired, as many disks as possible should be enabled to participate in the rebuilding procedure. In some implementations, a way to achieve this may be for storage management application 21 to evenly distribute Mapped RAID extents to all the disks in the pool while creating the mapped RAID.

Example RAID Extent Layout

In some implementations, one Mapped RAID group may be a set of ordered RAID extents. When creating a Mapped RAID group, storage management application 21 may need to allocate many RAID extents from the extent pool. As noted above, one RAID extent may need a RAID width number of disk extents from different disks in the extent pool. Generally, storage management application 21 may allocate the RAID extents one by one. For ease of explanation only, assume the disk number in the pool is N, and the RAID extent width is M. In the example, there should be $c_n^m$ possible ways to combine a RAID extent. A typical case may be for storage management application 21 to create 4D+1P mapped RAID 5 on top of 16 disks, where there are $c_{16}^5=4368$ ways to allocate a RAID extent on top of 16 disks. In some implementations, for each RAID extent allocation, storage management application 21 may loop over all the possible choices, and select the best one. In the example, the searching depth may be $c_n^m$.

Example Pool with Hybrid Disk Capacities:

In some implementations, it may be desirable to have the disks with different capacities to coexist on a disk pool; however, generally, the more common scenario may be that with the passage of time, the disk pool, upon which Mapped RAID may be based, may be replaced or disks with different capacities may be added due to, e.g., sparing or expansion. Generally, there may be some approaches to address this issue. For example, the first approach may include grouping the disks by capacity, and laying out RAID extents on the respective groups. This may require a minimal size for each group, which may result in a minimal disk count limitation for each capacity. As another example, a second approach may include using the larger disk as a smaller one before reaching the minimal count, but this may result in some wasted disk capacity.

Figure 6:
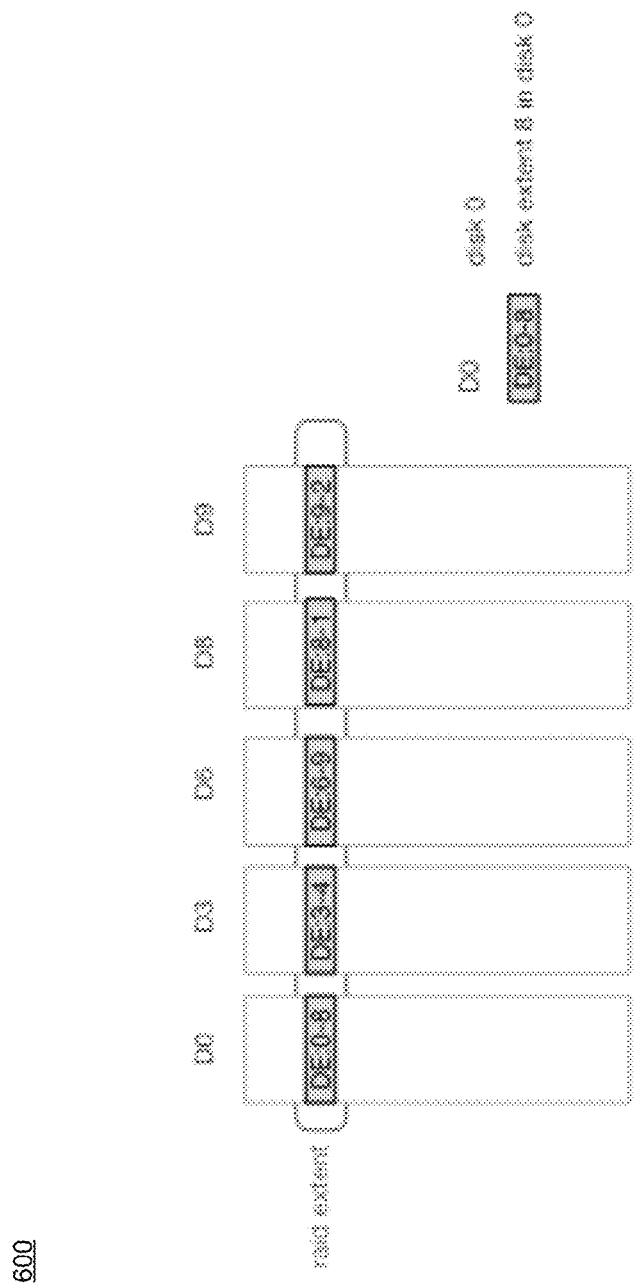
FIG. 6 is an example diagrammatic view of a disk relationship layout of FIG. 1 according to one or more example implementations of the disclosure.

Example Neighborhood Matrix:

In some implementations, storage management application 21 may evaluate whether or not the RAID extents distribution is even among the storage devices, which may be accomplished using a "neighborhood matrix." For example, and referring at least to the example implementation of FIG. 6, an example disk relationship layout 600 is shown. Generally, a neighborhood matrix may be described as an N*N square matrix, where N is the number of disks in the pool. Each number in the matrix may be denoted as NM(i, j), which stands for how many times disk i has ever neighbored with disk j. While allocating a RAID extent, storage management process 10 may select some disk extents from different disks. In some implementations, storage management process 10 may define disks in the RAID extent neighbors with each other one time. Generally, the matrix should be a symmetric matrix, since with the example definition of "neighbor," NM(i, j) should be equal to NM(j, i). As shown in FIG. 6, storage management application 21 may combine 5 disk extents that may be from 5 different disks together into one RAID extent. After the RAID extent is created, storage management application 21 may generally count these 5 disk neighbors each other one time. For example, disk_0 is neighbors with disk_3 one time, disk_3 is neighbors with disk_9 one time, etc.

Figure 7:
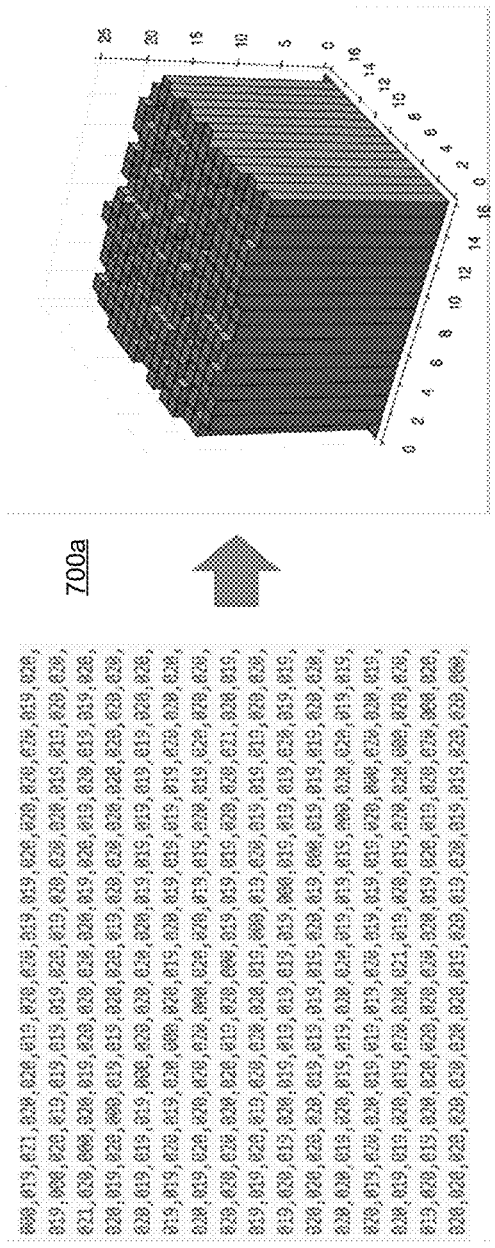
FIG. 7 is an example diagrammatic view of matrices according to one or more example implementations of the disclosure.
Figure 7:
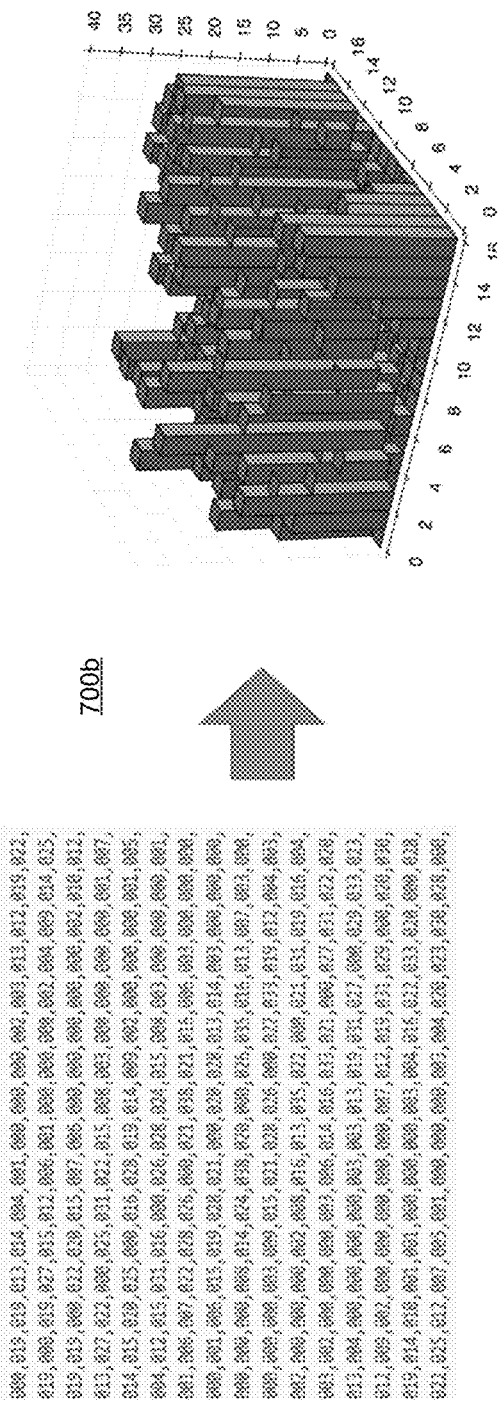

Matrix Examples:

Referring at least to the example implementation of FIG. 7, an example of a "good" example matrix 700a and of a "bad" example matrix 700b is shown. In good example matrix 700a, the numbers in the matrix are closer to each other, which may range from, e.g., 19 to 21 in this example. In the bad example matrix 700b, there is shown a significant difference between the numbers in the matrix, and even worse, some numbers are zero, which means that some disks never neighbor with each other. Therefore, in this example, if one disk fails, some disks may not participate the rebuilding procedure.

Example Weighted Neighborhood Matrix:

Generally, when the above-noted neighborhood matrix is "flat," the "neighbor times" between disks are similar, meaning storage management application 21 may allocate similar disk extent counts from each disk no matter what the real disk capacity is. For a pool with hybrid disk capacity, this may waste large amounts of disk capacity.

In some implementations, to take into account the disk capacity factor, storage management application 21 may make use of a Weighted Neighborhood Matrix (WNM) defined below by example:

$$WNM_{i,j}=NM_{i,j}*S_{typical}*S_{typical}/(S_i*S_j),$$

where $S_{typical}$: defined generally as the typical disk size in the pool, which may be minimal or other typical disk size in the pool.

$S_i, S_j$: defined generally as the size of the i-th or j-th disk in the pool.

With this weighted neighborhood matrix, storage management application 21 may normalize a larger disk's "neighborhood times" with other disks by a typical disk size. Therefore, storage management application 21 may allocate more extents from this disk to make the matrix more "flat." In some implementations, if storage management application 21 evenly distributes the RAID extents to disks in the pool with the bias to larger disks, values in the matrix may be closer to each other. Therefore, storage management application 21 may use an algorithm, which may make values in the weighted neighborhood matrix almost the same after completing the RAID extents allocation.

As will be discussed below, extent selection process 10 may at least help, e.g., the improvement of an existing storage technology, necessarily rooted in computer technology in order to overcome an example and non-limiting problem specifically arising in the realm of computer storage. For instance, extent selection process 10 may use an efficient process to layout Mapped RAID extents evenly to all disks (or other storage devices) with different capacities, which may result in an increased layout speed than other layout processes, and may improve the disk utilization ratio.

Figure 8:
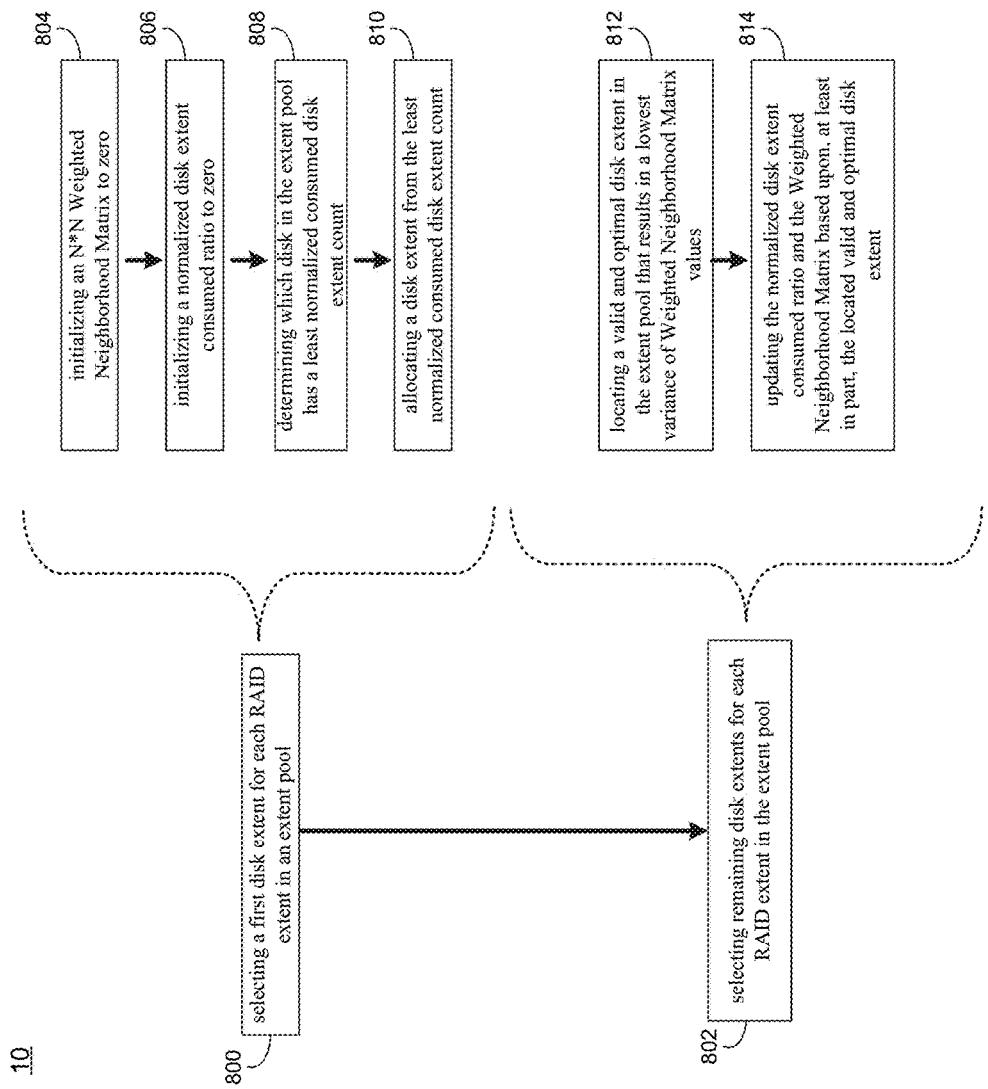
FIG. 8 is an example flowchart of an extent selection process according to one or more example implementations of the disclosure.
Figure 9:
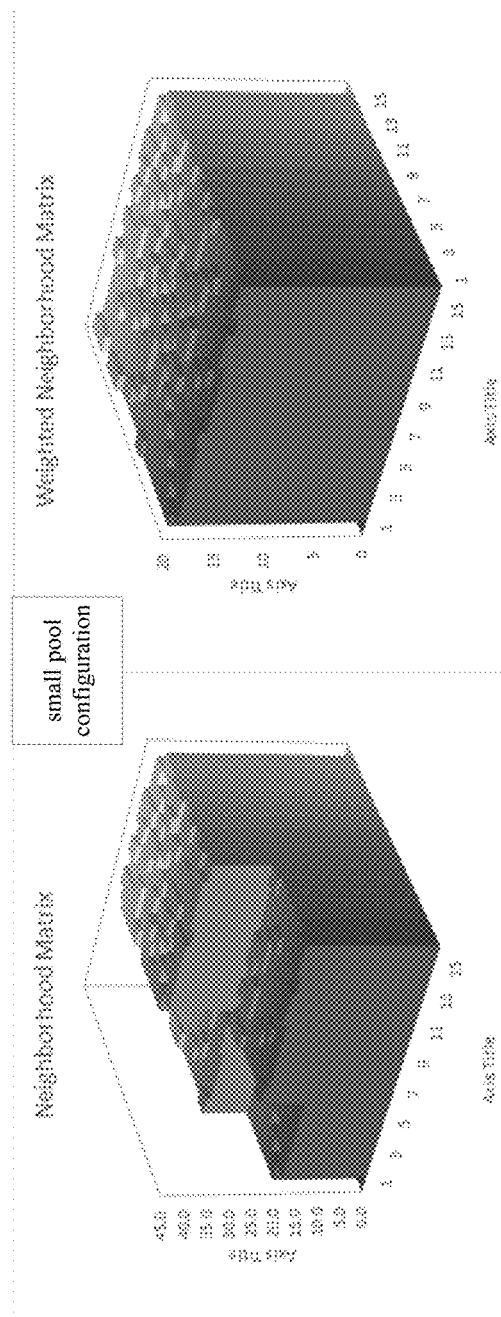
FIG. 9 is an example diagrammatic view of a small pool configuration according to one or more example implementations of the disclosure.
Figure 10:
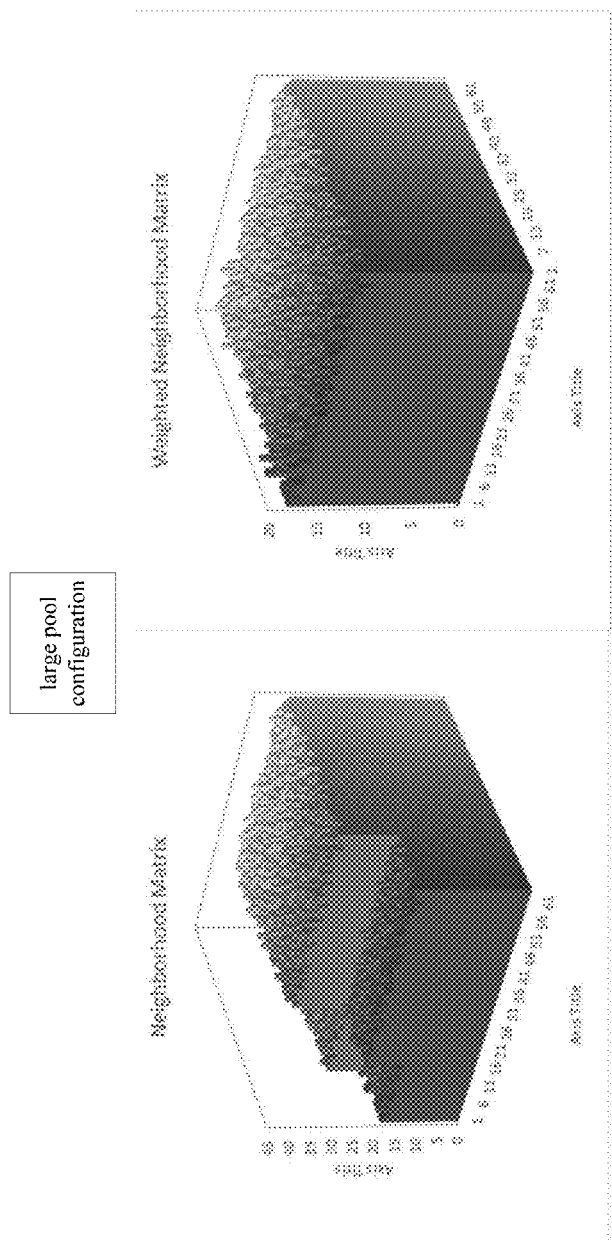
FIG. 10 is an example diagrammatic view of a large pool configuration according to one or more example implementations of the disclosure.

The Extent Selection (ES) Process:

As discussed above and referring also at least to the example implementations of FIGS. 8-10, extent selection (ES) process 10 may select 800, by a computing device, a first disk extent for each RAID extent in an extent pool. ES process 10 may select 802 remaining disk extents for each RAID extent in the extent pool.

As noted above, an example benefit of Mapped RAID may be the ability to provide better rebuild performance than traditional RAID, and to get a better rebuild performance when creating a Mapped Raid, ES process 10 may attempt to evenly distribute Mapped RAID extents to disks. This may be due to the fact that when disks fail in the same time, they may contain data for the same RAID extent, which may leads to data loss. The more disks in one extent pool, the more possible disks may fail in the same time. In this way, when one disk fails, all the other disks may be involved in the entire rebuilding procedure. However, when creating a Mapped RAID group on a pool with hybrid disk capacities, the disk utilization ratio may be a key criterion. For example, ES process 10 may create an extent pool with, e.g., 8 1 TB size disks and 8 2 TB size disks, resulting in a hybrid capacity extent pool. As will be discussed below, ES process 10 may utilize an efficient algorithm to layout Mapped RAID extents evenly to all disks that have different capacities, while improving the disk utilization ratio.

It will be appreciated that while "disks" are used in the example, other storage device types may be used without departing from the scope of the disclosure. Therefore, as used herein, the term disk may be used interchangeably with other storage device types where appropriate. As such, the use of a disk should be taken as example only and not to otherwise limit the scope of the disclosure.

In some implementations, ES process 10 may select 800, by a computing device, a first disk extent for each RAID extent in an extent pool. For instance, assume for example, purposes only that ES process 10 is tasked to layout a Mapped RAID group. For ease of discussion, assume for example purposes only that the number of RAID extents in the RAID group is E, the number of disks in the extent pool is N, and the RAID extent width is M. As noted in FIG. 5 above, the possible RAID extent combination is a huge number, and thus it may be difficult to search all possible choices to find and select 800 the "best" one (e.g., the choice that will lead to the lowest variance of the Weighted Neighborhood Matrix values).

Additionally, it may be difficult to determine which disk extent should be selected 800 and allocated in the RAID extent. For example, when allocating the first disk extent for the RAID extent, there may not be any existing disk extent in the RAID extent, and as a result, the Weighted Neighborhood Matrix may be identical for all possible choices. Thus, the Weighted Neighborhood Matrix may be insufficient by itself to find and select 800 the best choice for the first disk extent.

In some implementations, selecting 800 the first disk extent may include initializing 804 an N*N Weighted Neighborhood Matrix to zero. For example, ES process 10 may initialize 804 the N*N Weighted Neighborhood Matrix to all zero. The matrix may be stored in memory, and ES process 10 may set the memory to 0 to initialize 804 the matrix. For example, in C language, ES process 10 may use function memset(p, 0, sizeof(*p)).

In some implementations, selecting 800 the first disk extent may further include initializing 806 a normalized disk extent consumed ratio to zero. For example, the data may be stored in memory, and ES process 10 may set the memory to 0 to initialize 806 it. ES process 10 may utilize a normalized disk utilization ratio to select the first disk extent for each RAID extent. As noted above, the Weighted Neighborhood Matrix may be insufficient by itself to find and select 800 the best choice for the first disk extent. Thus, ES process 10 may use the normalized disk extent consumed count as the criteria. As will be discussed below, ES process 10 may select 800 the disk extent on the disk with least normalized consumed count as the first disk extent for the target RAID extent.

Generally, for disks in the extent pool, the more disk extents consumed by Mapped RAID, the more I/Os may be sent to it. Thus, ES process 10 may make the disk extent consumed ratio to be balanced among the disks. The consumed disk extent count of i-th disk may be denoted as: C(i).

As the disk capacities are different in the extent pool, ES process 10 may normalize the consumed disk extent count, denoted as: nC(i).

Thus, $$nC(i) = C(i) * \frac{Capacity}{Typical\ Capacity}$$

where, the typical capacity is a constant value for the extent pool, which may be any selected capacity.

In some implementations, selecting 800 the first disk extent may further include determining 808 which disk in the extent pool has a least normalized consumed disk extent count. As noted above, the Weighted Neighborhood Matrix may be insufficient by itself to find and select 800 the best choice for the first disk extent. Thus, ES process 10 may use the normalized disk extent consumed count as the criteria. As such, ES process 10 may select 800 the disk extent on the disk that has been determined 808 to have the least normalized consumed count as the first disk extent for the target RAID extent. For instance, using the above equation, the disk with the least nC(i) may have the least normalized consumed disk extent count.

In some implementations, selecting 800 the first disk extent may further include allocating 810 a disk extent from the least normalized consumed disk extent count. For example, ES process 10 may loop over all disks in the extent pool to find the one with the least normalized consumed count, and once ES process 10 has determined 808 that a particular disk extent from the extent pool has the least normalized consumed disk extent count, ES process 10 may select 800 that disk extent to be the first disk extent for the target RAID extent (e.g., for E RAID extent), and may allocate one disk extent from it, similarly to how other disk extents may be allocated.

In some implementations, ES process 10 may select 802 remaining disk extents for each RAID extent in the extent pool. For instance, assume for example purposes only that ES process 10 has determined 808 that a particular disk extent from the extent pool has the least normalized consumed disk extent count, and therefore has selected 800 that disk extent to be the first disk extent for the target RAID extent. In the example, ES process 10 may now use Weighted Neighborhood Matrix to select 802 the other remaining disk extent choices one by one for each RAID extent.

In some implementations, selecting 802 the remaining disk extents for each RAID extent in the extent pool may include locating 812 a valid and optimal disk extent in the extent pool that results in a lowest variance of Weighted Neighborhood Matrix values. For example, ES process 10 may loop over all disks in the extent pool to find the one with a valid and optimal disk extent in the extent pool that results in a lowest variance of Weighted Neighborhood Matrix values. For instance, ES process 10 may allocate the disk extent one by one for the RAID extents. For each iteration, ES process 10 evaluate all possible disk extent allocation positions and locate 812 the best one. As noted above, the "best" may be the disk extent that will lead to the lowest variance of the Weighted Neighborhood Matrix values. For example, assume a width 10 extent pool, RAID width is 5, 3 disk extents have been allocated for the current RAID extent. ES process 10 may loop over the left 7 disks and try to calculate the impact to the Matrix when selecting that disk as a candidate. As one non-limiting example technique, ES process 10 may add the neighborhood value of the candidate disk and exiting 3 disks, and select the candidate which generates the least sum as the result. Assume for example purposes only that the search depth for one disk extent is the pool width N, thus, the algorithm for ES process 10 to completely layout one RAID extent may be: O(N*M), which may be a computable scope and much smaller then $c_n^m$.

In some implementations, the normalized disk extent consumed ratio and the Weighted Neighborhood Matrix may be updated 814 by ES process 10 based upon, at least in part, the located valid and optimal disk extent. For example, after ES process 10 locates 812 and allocates the disk extent that will lead to the lowest variance of the Weighted Neighborhood Matrix values, ES process 10 may update the normalized disk extent consumed ratio and the Weighted Neighborhood Matrix based upon the located 812 valid and optimal disk extent. For instance, similar to the discussion above, when a new disk extent is added to existing RAID extent, a new neighborhood relationship may be constructed, and the Matrix may be updated according to the definition.

In some implementations, and referring at least to the example implementations of FIGS. 9-10, the running results of some typical cases implemented by ES process 10 are shown. FIG. 9 shows an example small pool configuration (e.g., where the disk number in the pool N is 16 (6×100 disk extents, 10×150 disk extents), the RAID extent width M is 5 (4+1 R5)), and FIG. 10 shows an example large pool configuration (e.g., where the disk number in the pool N is 64 (17×100 disk extents, 47×150 disk extents), the RAID extent width M is 16 (14+2 R6)). As can be seen, the layout result is "good", in that the right figures show the Weighted Neighborhood Matrix as being flat, and the left figure is the real matrix, showing more disk extents are allocated from larger disks, and therefore, there may be more neighborhood values between larger disks.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   selecting, by a computing device, a first disk extent for each RAID extent in an extent pool; and
   selecting remaining disk extents for each RAID extent in the extent pool, wherein selecting the remaining disk extents for each RAID extent in the extent pool includes locating a valid and optimal disk extent in the extent pool that results in a lowest variance of Weighted Neighborhood Matrix values, wherein the Weighted Neighborhood Matrix values are generated based upon, at least in part, how many times a disk extent from a respective disk is combined with a disk extent from another disk in a RAID extent.

2. The computer-implemented method of claim 1 wherein selecting the first disk extent includes initializing an N*N Weighted Neighborhood Matrix to zero.

3. The computer-implemented method of claim 2 wherein selecting the first disk extent further includes initializing a normalized disk extent consumed ratio to zero.

4. The computer-implemented method of claim 3 wherein selecting the first disk extent further includes determining which disk in the extent pool has a least normalized consumed disk extent count.

5. The computer-implemented method of claim 4 wherein selecting the first disk extent further includes allocating a disk extent from the least normalized consumed disk extent count.

6. The computer-implemented method of claim 1 further comprising updating the normalized disk extent consumed ratio and the Weighted Neighborhood Matrix based upon, at least in part, the located valid and optimal disk extent.

7. A computer program product residing on a non-transitory computer readable storage medium having a plurality of instructions stored thereon which, when executed across one or more processors, causes at least a portion of the one or more processors to perform operations comprising:
   selecting a first disk extent for each RAID extent in an extent pool; and
   selecting a remaining disk extents for each RAID extent in the extent pool, wherein selecting the remaining disk extents for each RAID extent in the extent pool includes locating a valid and optimal disk extent in the extent pool that results in a lowest variance of Weighted Neighborhood Matrix values, wherein the Weighted Neighborhood Matrix values are generated based upon, at least in part, how many times a disk extent from a respective disk is combined with a disk extent from another disk in a RAID extent.

8. The computer program product of claim 7 wherein selecting the first disk extent includes initializing an N*N Weighted Neighborhood Matrix to zero.

9. The computer program product of claim 8 wherein selecting the first disk extent further includes initializing a normalized disk extent consumed ratio to zero.

10. The computer program product of claim 9 wherein selecting the first disk extent further includes determining which disk in the extent pool has a least normalized consumed disk extent count.

11. The computer program product of claim 10 wherein selecting the first disk extent further includes allocating a disk extent from the least normalized consumed disk extent count.

12. The computer program product of claim 7 wherein the operations further comprise updating the normalized disk extent consumed ratio and the Weighted Neighborhood Matrix based upon, at least in part, the located valid and optimal disk extent.

13. A computing system including one or more processors and one or more memories configured to perform operations comprising:

selecting a first disk extent for each RAID extent in an extent pool; and selecting a remaining disk extents for each RAID extent in the extent pool, wherein selecting the remaining disk extents for each RAID extent in the extent pool includes locating a valid and optimal disk extent in the extent pool that results in a lowest variance of Weighted Neighborhood Matrix values, wherein the Weighted Neighborhood Matrix values are generated based upon, at least in part, how many times a disk extent from a respective disk is combined with a disk extent from another disk in a RAID extent.

14. The computing system of claim 13 wherein selecting the first disk extent includes initializing an N*N Weighted Neighborhood Matrix to zero.

15. The computing system of claim 14 wherein selecting the first disk extent further includes initializing a normalized disk extent consumed ratio to zero.

16. The computing system of claim 15 wherein selecting the first disk extent further includes determining which disk in the extent pool has a least normalized consumed disk extent count.

17. The computing system of claim 16 wherein selecting the first disk extent further includes allocating a disk extent from the least normalized consumed disk extent count.

* * * * *